Dec. 9, 1952     H. G. BENZ     2,620,762
TIRE PRESSURE ALARM
Filed Aug. 13, 1948
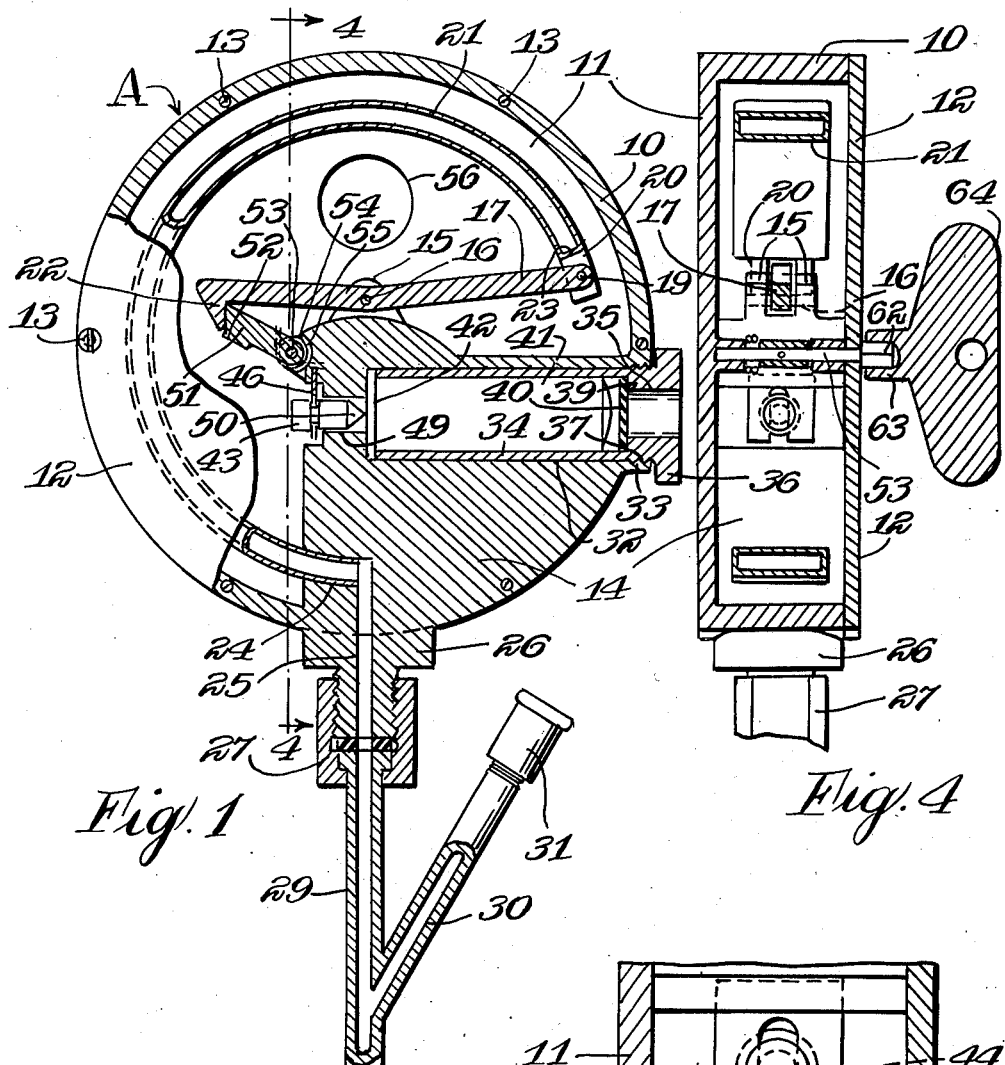
Fig. 1
Fig. 4
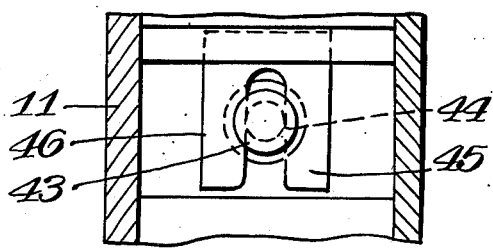
Fig. 3
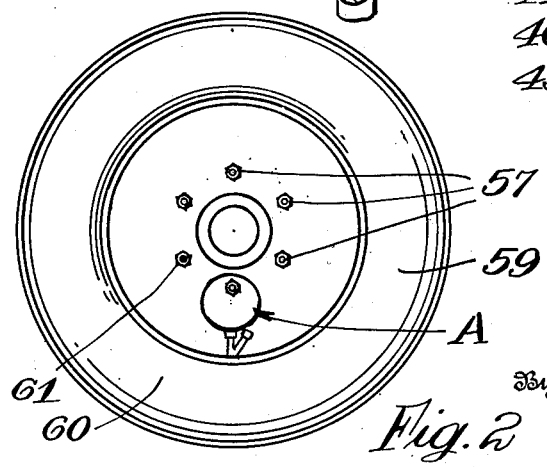
Fig. 2
Inventor
Herbert G. Benz
By Robert M. Dunning Patented Dec. 9, 1952

2,620,762

UNITED STATES PATENT OFFICE 2,620,762

TIRE PRESSURE ALARM

Herbert George Benz, St. Paul, Minn.

Application August 13, 1948, Serial No. 44,187

1 Claim. (Cl. 116—34)

My invention relates to an improvement in tire pressure alarm, wherein it is desired to provide an apparatus capable of giving an alarm when tire pressure drops below a certain minimum.

Many tires are ruined due to the failure of the driver of a vehicle to stop promptly when the air begins to leave the tire. In the case of a slow leak, the pressure leaves the tire gradually and the tire is often almost flat before the driver realizes that the tire pressure is dropping. Many tires that could be saved are thus ruined by movement of the car after the pressure in the tire has dropped below a predetermined minimum.

The object of the present invention lies in the provision of a simple means capable of sounding an alarm when the pressure in the tire drops below a predetermined minimum. The alarm is in the form of an exploding blank cartridge mounted upon the wheel.

A feature of the present invention lies in the provision of a support for a blank cartridge mounted upon a wheel for rotation therewith. The cartridge is supported adjacent a firing pin capable of exploding the cartridge. A spring urged trigger is pivotally supported near the firing pin to actuate the same. The trigger is controlled by action of a Bourdon tube, the interior of which communicates with the interior of the tire tube. The pressure within the tire is thus communicated to the interior of the Bourdon tube and the curvature of this tube depends upon the contained pressure. When the pressure in the tube decreases, the radius of curvature of the tube decreases, operating the trigger to explode the cartridge.

A feature of the present invention lies in the use of a curved tube closed at its outer end and connected at its inner end to the valve stem of the tire. The tube is of such a character that the radius of curvature thereof increases in internal pressure in the tube. Accordingly by merely decreasing the pressure within the tube and connecting the free end of the tube to a suitable trigger operating mechanism, a reduction in pressure in the tube may be employed to actuate the trigger to explode the cartridge.

A feature of the present invention lies in the fact that the tube connected to the tire to receive the pressure therefrom is sealed with respect to the tire tube. As a result, the tire pressure cannot escape through the tube and the danger of accidental deflation of the tire is obviated.

These and other objects and novel features of my invention will be more clearly and fully set forth in the following specification and claim.

In the drawings forming a part of my specification:

Figure 1 is an enlarged elevational view of my tire pressure alarm, partially in section showing the construction thereof.

Figure 2 is an elevational view of a vehicle wheel showing the manner in which the alarm may be attached thereto.

Figure 3 is an elevational view of a detailed portion of my construction.

Figure 4 is a sectional view through my alarm, the position of the section being indicated by the line 4—4 of Fig. 1.

The alarm A includes a cup shaped body having a generally cylindrical flange 10 and a closure wall 11 at one end thereof. A removable closure disc 12, a portion of which is illustrated in Figure 1 of the drawings, is secured to the opposite end of the body by cap screws 13 or other suitable means.

A portion of the interior of the cup shaped body is filled in to provide an internal boss or projection 14 integral with the cylinder wall 10 and the end closure member 11. A pair of spaced ears 15 project from one portion of this boss 14 and a pivot pin 16 extends between these ears 15. A lever 17 is pivotally supported on the pivot pin 16. One end of the lever 17 is pivotally connected at 19 to a projecting ear 20 on the end of a hollow curved tube 21. The other end of the lever 17 is provided with a hooked shaped projection 22 for a purpose which will be later described in detail.

The tube 21 is relatively wide and thin and is curved at approximately the same curvature as the cylindrical wall 10 and is of slightly smaller radius. The tube 21 is closed at its free end 23, the ears 20 projecting from this closed end. The opposite end of the tube 21 is inserted in a socket or recess 24 in the boss 14. The tube is sealed to the boss 14 so that no pressure can escape about the walls of the tube.

The socket 24 communicates with a radially extending passage 25 which projects through a radially extending boss 26 on the outer surface of the wall 10. A reduced diameter portion 27 of the boss 26 projects from the boss and the passage 25 extends through this threaded extension. The extension 27 is threaded into a valve stem 29 connected to the tire tube. The stem 29 may be provided with a branch 30 which contains the conventional valve stem to prevent the escape of pressure from the tube. A valve cap 31 of conventional type may be provided on the stem 30.

A cylindrical aperture 32 extends inwardly into the boss 14 through the cylindrical wall 10. A boss 33 is provided on the outer surface of the wall 10 in axial alignment with the aperture 32. The aperture 32 is designed to accommodate an elongated sleeve 34. A portion of the sleeve 34 near the outer extremity thereof is provided with a reduced diameter opening 35 therethrough. A flange 36 on the outer end of the sleeve 34 provides a means of rotating the sleeve and a portion of the exterior surface of the sleeve near the flange 36 is threaded as indicated at 37 to fit the internal threads of the boss 33. In other words, the elongated sleeve 34 may be threaded into the aperture 32 and held in place by the cooperable threads.

A shoulder 39 is provided between the large diameter portion of the sleeve 34 and the small diameter portion 35 thereof. A plug or diaphragm 40 is provided adjacent the shoulder 39 to prevent water and the like from entering through the passageway in the sleeve. A cartridge 41 is enclosed within the sleeve 34, the rim 42 of the cartridge being interposed between the end of the sleeve 34 and the end of the aperture 32 in which the sleeve is accommodated.

A pointed firing pin 43 is supported in axial alignment with the cartridge 41 and in position to explode the same. The pin 43 is provided with a peripheral groove 44 extending thereabout, this groove being designed to accommodate the bifurcated end 45 of a flat spring 46. A flat spring 46 is mounted in a groove 47 in the boss 14, the spring holding the pin 43 from sliding outwardly from a passage 49 in axial alignment with the aperture 32. The spring 46 holds the firing pin 43 with the pointed end 50 of the firing pin in substantial contract with the rim end of the cartridge 41. The opposite end of the firing pin is held in the path of movement of a striking arm 51.

The striking arm or hammer 51 is provided with a hammer end 52 and a pivot which is pivotally mounted upon a pivot 53 to a pair of spaced ears 54 on the boss 14. The free end of the hammer 51 is shaped to engage the hook end 22 of the lever 17, this lever acting as a means of holding the hammer from pivotal movement. A spring 55 encircles the pivot 53 and urges the hammer 51 in a counter-clockwise direction as viewed in Figure 1 of the drawings. When the hammer 51 is released by the lever 17 the spring 55 urges this hammer in a counter-clockwise direction to strike against the firing pin 43 and to explode the cartridge 41.

The tube 21 acts in the manner of a Bourdon tube to accomplish the result desired. The tube is so constructed that when the interior of the tube is subjected to the pressure normally used within the tire tube, the radius of the tube will be expanded sufficiently to pivot the lever 17 into interlocking relation with the hammer 51. However, when the pressure within the tube drops below a predetermined minimum, the radius of curvature of the tube 21 decreases sufficiently to pivot the lever 17 out of engagement with the hammer 51 allowing the hammer to rotate against the firing pin and to explode the cartridge 41.

It will be noted that the cartridge 41 may be replaced by removing the sleeve 34 enclosing the cartridge. After the tube has been filled to the proper extent the hammer 51 must be swung into cooperable engagement with the lever 17, this lever then acting as a trigger for holding the hammer from operation.

If desired, an aperture 56 may be provided in the rear closure of the housing to accommodate one of the studs 57 used in holding the wheel 59 supporting the tire 60.

The stud 57 extends through the aperture 56 and a nut 61 is threaded onto the stud to hold the indicator in place and also to hold the wheel in place.

The stem 29 connected to the gauge may, if desired, comprise a flexible tube connecting a branch of the valve stem to the alarm. In any event, the tire pressure within the tire tube is communicated to the interior of the Bourdon tube 21 to actuate the alarm.

As indicated in Figure 4 of the drawings, the pivot 53 extends through the front closure plate 12. The projecting end 62 of the pivot 53 is squared or flattened to extend into the socket end 63 of a removable key 64. The key 64 may be used to rotate the pivot 53 and the hammer 51 which rotates therewith. The hammer can be reset by use of the key 64 when pressure is provided within the tire.

In accordance with the patent statutes, I have described the principles of construction and operation of my tire pressure alarm, and while I have endeavored to set forth the best embodiment thereof, I desire to have it understood that obvious changes may be made within the scope of the following claim without departing from the spirit of my invention.

I claim:

A tire pressure alarm including a pressure actuated member, means connecting said pressure actuated member to a tire to communicate tire pressure thereto, a trigger pivotally supported adjacent said pressure actuated member and normally urged in one direction, said pressure actuating means controlling the actuation of said trigger to release said trigger upon a drop in tire pressure, a cartridge supported adjacent to said trigger, a firing pin supported in the path of movement of said trigger and engageable with the cartridge to actuate the same, and means removably secured to said trigger for rotating the trigger in a direction to reset the same.

HERBERT GEORGE BENZ.

REFERENCES CITED

The following references are of record in the file of this patent:

UNITED STATES PATENTS

| Number | Name | Date |
|---|---|---|
| 583,543 | Nelson | June 1, 1897 |
| 1,156,862 | Sibley | Oct. 12, 1915 |
| 1,281,274 | Berry | Oct. 15, 1918 |
| 1,800,801 | Marklund | Apr. 14, 1931 |
| 2,268,783 | Tate | Jan. 6, 1942 |